US008592748B2

(12) United States Patent
Gall et al.

(10) Patent No.: US 8,592,748 B2
(45) Date of Patent: Nov. 26, 2013

(54) METHOD AND ARRANGEMENT FOR SIMULATION OF HIGH-QUALITY DAYLIGHT SPECTRA

(75) Inventors: Michael Gall, Salach (DE); Jan Lalek, Puszczykowo (PL)

(73) Assignee: Just Normlicht GmbH Vertrieb + Produktion, Weilheim (DE)

( * ) Notice: Subject to any disclaimer, the term of this patent is extended or adjusted under 35 U.S.C. 154(b) by 449 days.

(21) Appl. No.: 12/807,522

(22) Filed: Sep. 8, 2010

(65) Prior Publication Data

US 2011/0062873 A1 Mar. 17, 2011

(30) Foreign Application Priority Data

Sep. 10, 2009 (DE) ........................ 10 2009 040 812

(51) Int. Cl.
*G01D 18/00* (2006.01)

(52) U.S. Cl.
USPC ........................................ 250/252.1; 362/231

(58) Field of Classification Search
USPC .................... 362/1, 227, 231; 250/252.1, 552
See application file for complete search history.

(56) References Cited

U.S. PATENT DOCUMENTS

| | | | | |
|---|---|---|---|---|
| 6,844,931 | B2 | 1/2005 | Ehbets | |
| 7,354,172 | B2 * | 4/2008 | Chemel et al. | 362/231 |
| 7,568,815 | B2 * | 8/2009 | Lee et al. | 362/231 |
| 7,710,369 | B2 * | 5/2010 | Dowling | 345/83 |

FOREIGN PATENT DOCUMENTS

| | | |
|---|---|---|
| DE | 10 2004 049 604 | 6/2005 |
| DE | 10 2005 019 135 | 11/2005 |
| DE | 10 2006 003 257 | 8/2007 |
| DE | 10 2006 038 504 | 2/2008 |
| EP | 1 314 972 | 5/2003 |
| WO | WO 2007/083250 | 7/2007 |

OTHER PUBLICATIONS

International Standard ISO 3664, Third Edition Apr. 15, 2009, Graphic Technology and photography—viewing conditions (spec. pp. 4, 7, and 12).

English translation of DIN 6173 Part 1, Jan. 1975, "Colour matching—General conditions for colour matching", (spec. pp. 7 and 12).

English translation of DIN 6173 Part 2, "Colour matching—Lighting conditions for average artificial daylight", Oct. 1983 (spec. pp. 7 and 12).

CIE Technical Report, Method of Measuring and Specifying Colour Rendering Properties of Light Sources, CIE Mar. 13, 1995 (spec. pp. 8, 12, and 17).

(Continued)

*Primary Examiner* — Thuy Vinh Tran
(74) *Attorney, Agent, or Firm* — Collard & Roe, P.C.

(57) ABSTRACT

A method and a multispectral color coordination system simulates high-quality daylight spectra. Light is produced with LEDs disposed in groups. Each group emits light at different wavelengths within the daylight spectrum. The wavelength of the light emitted by each LED at different working temperatures and different PWM values is measured. The measurement results for each LED are stored in memory, with assignment to working temperatures and PWM values. The LEDs are actuated at values selected from the memory content, as a function of the light to be emitted by each group. The working temperature of each individual LED chip is constantly measured and compared with the values stored in memory with regard to the current working temperature, and, in case of deviation compensated for by recalculating the spectrum, taking into consideration the PWM values stored in memory for the working temperature, and actuating with these.

9 Claims, 9 Drawing Sheets

(56) References Cited

OTHER PUBLICATIONS

International Standard ISO 23603, CIE S 012/E, First edition Aug. 1, 2005, Standard method of assessing the spectral quality of daylight simulators for visual appraisal and measurement of colour.

CIE Technical Report Colorimetry, CIE 15:2004 $3^{rd}$ Edition (2004).

Wikipedia entry "CIE 1931 color space", downloaded on Jul. 30, 2011 from http://en.wikipedia.org/wiki/CIE_1931_color_space.

* cited by examiner

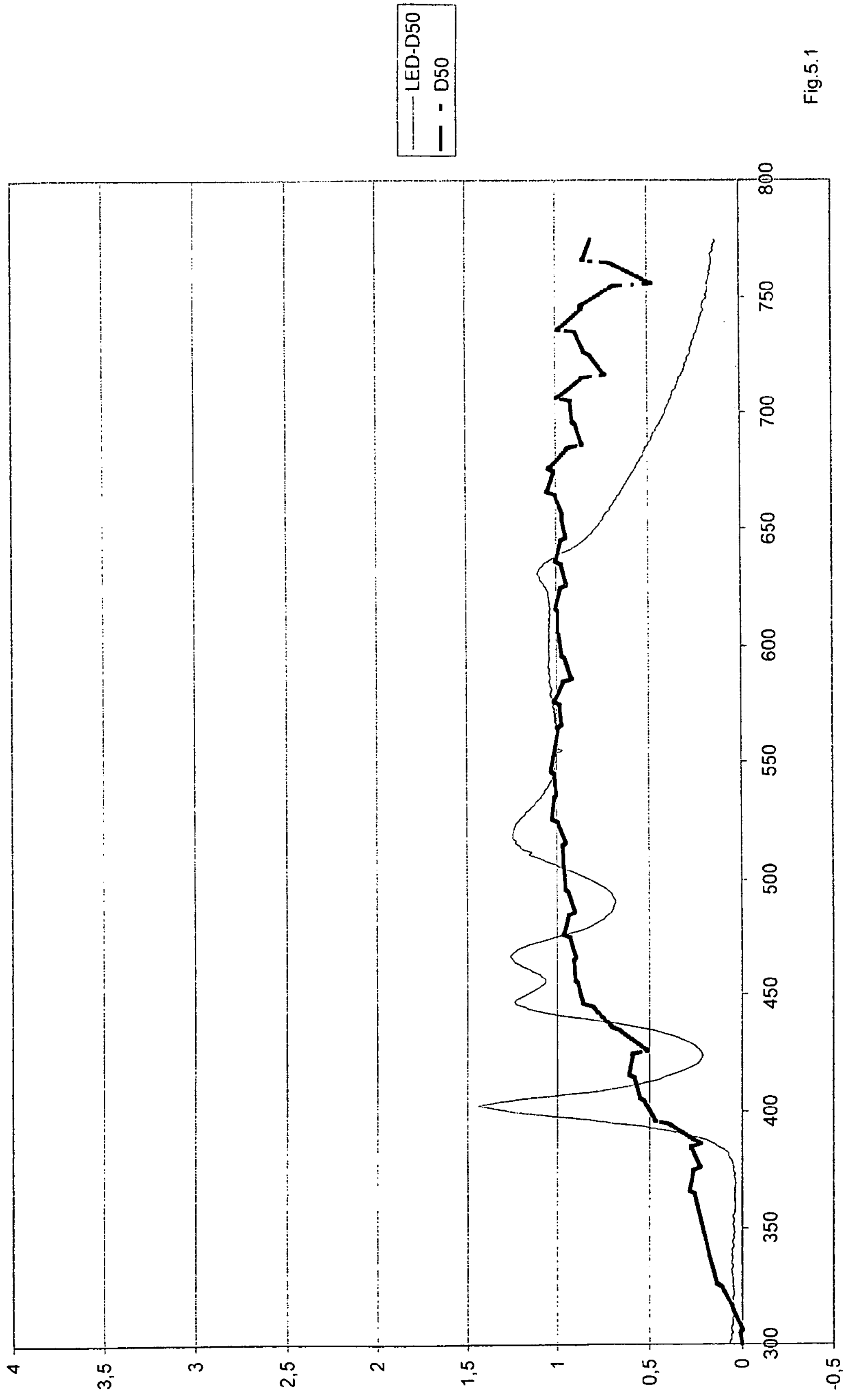
Fig.5.1

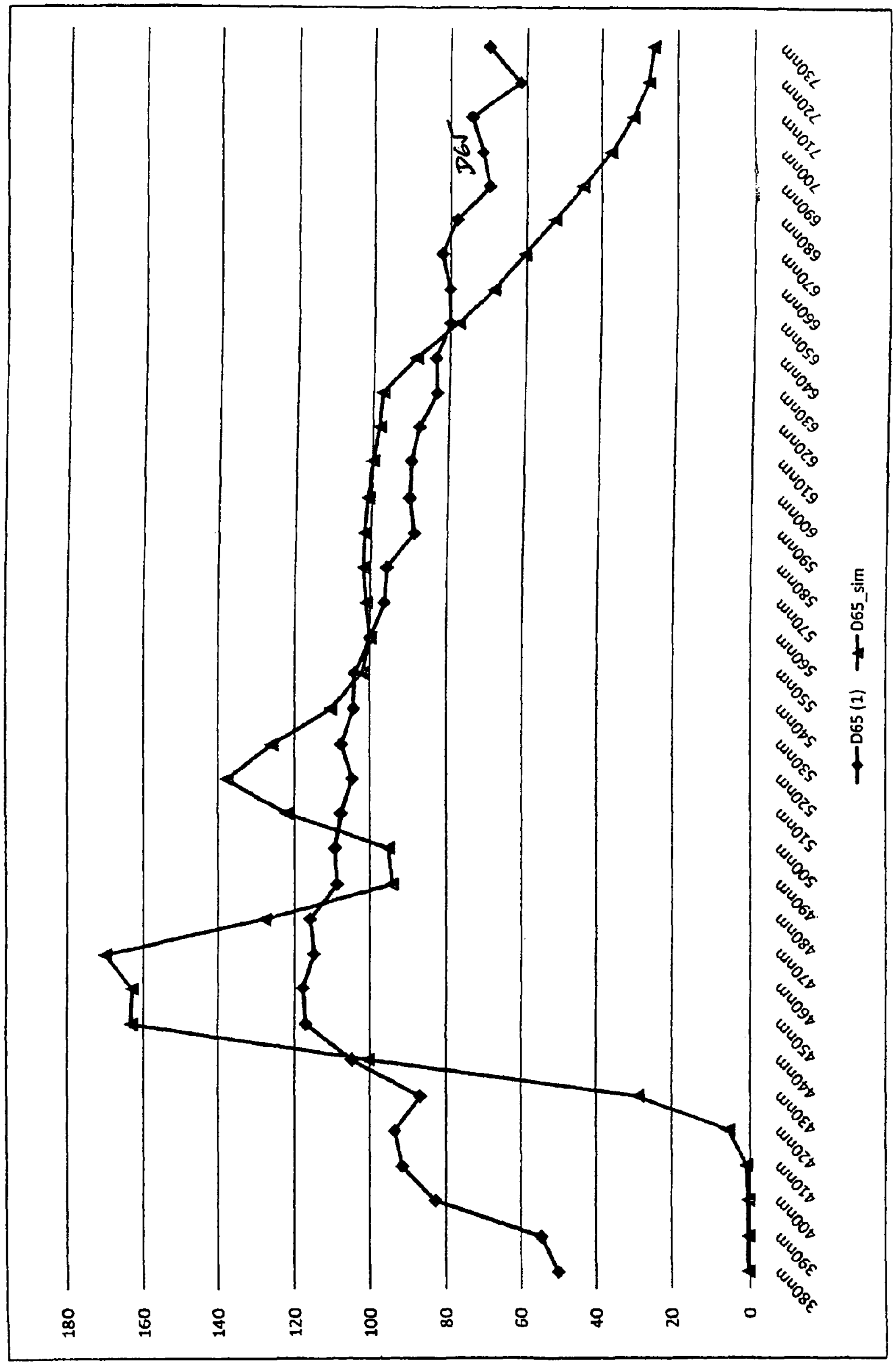
Fig. 5.2

Fig. 5.3
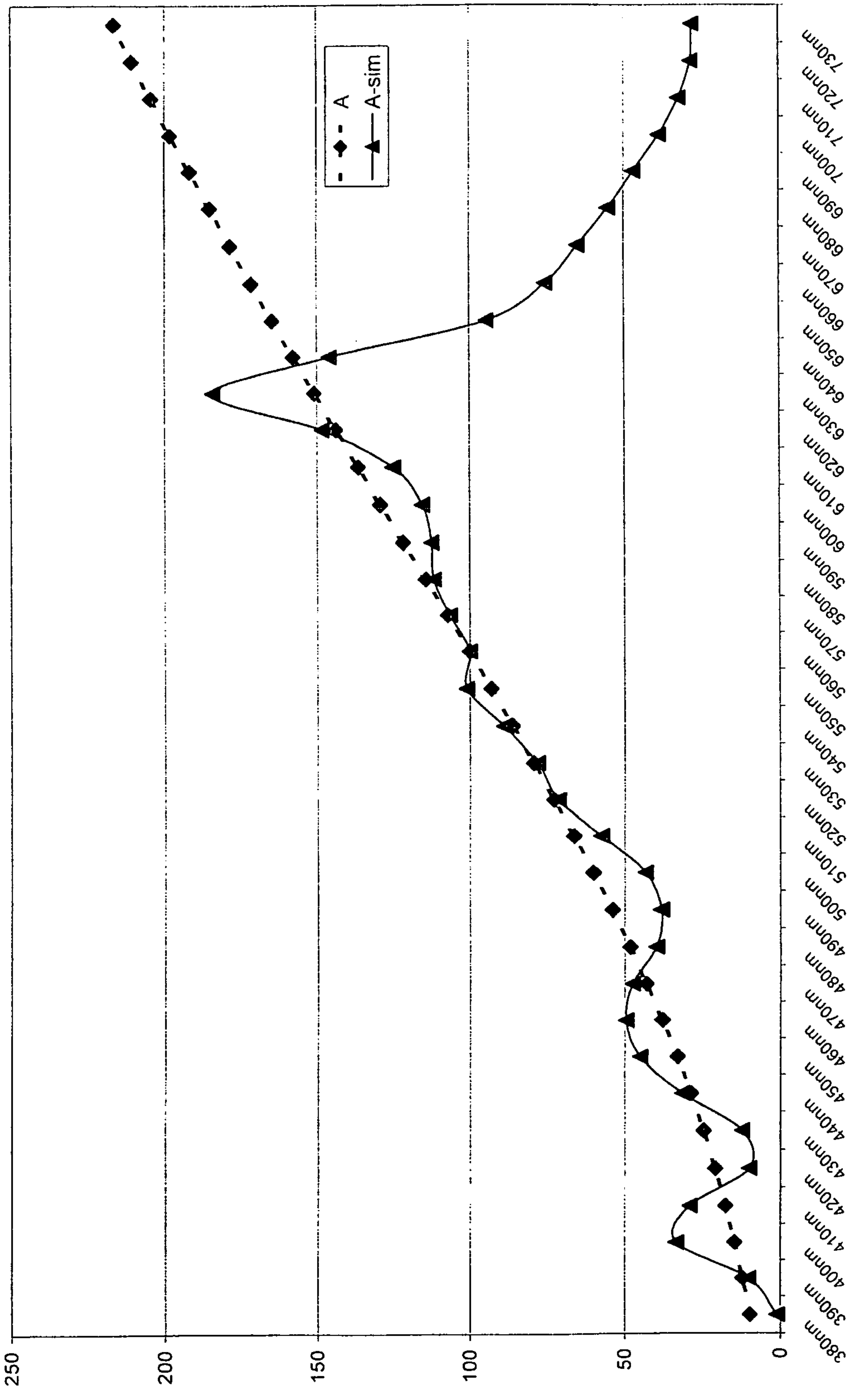

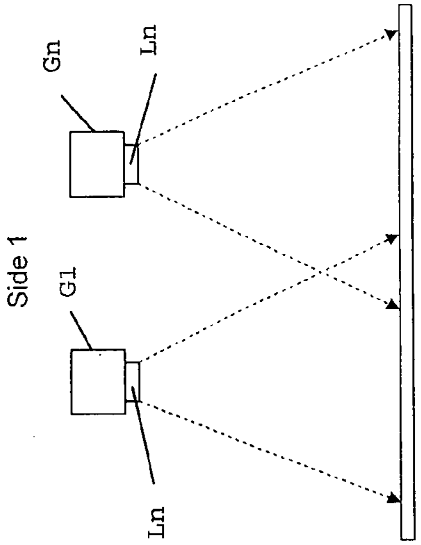
Fig. 6.2
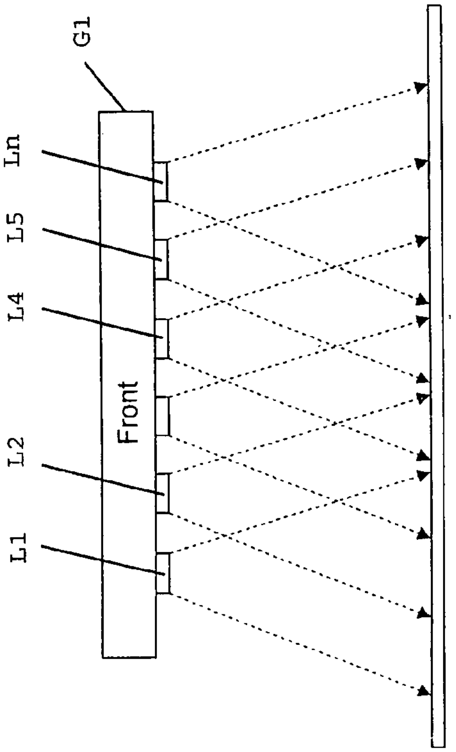
Fig. 6.1
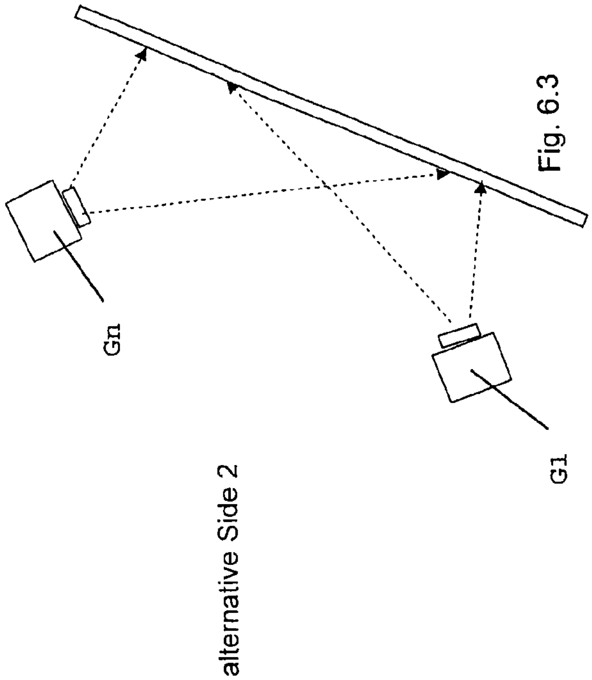
Fig. 6.3

METHOD AND ARRANGEMENT FOR SIMULATION OF HIGH-QUALITY DAYLIGHT SPECTRA

CROSS REFERENCE TO RELATED APPLICATIONS

Applicants claim priority under 35 U.S.C. §119 of German Application No. 10 2009 040 812.6 filed on Sep. 10, 2009, the disclosure of which is incorporated by reference.

BACKGROUND OF THE INVENTION

1. Field of the Invention

The invention relates to a method for simulation of high-quality daylight spectra at color temperatures in the range of 2,700 K to 10,000 K, particularly for the purpose of lighting matching surfaces in subjectively visual color coordination of a finished product with artwork, in the graphics industry, as well as in other industrial sectors. The invention furthermore relates to a multispectral color coordination system for performing the method according to the invention.

2. Description of the Related Art

In the graphics industry, color-precise reproduction between artwork (proof or original artwork, such as, for example, textiles, plastic parts, painted parts, motor vehicle interior, etc.) and print is an essential prerequisite for meeting the ever greater demands on quality assurance and the requirement to reduce costs.

Aside from quality control using measurement technology, a visual assessment of the color agreement achieved is an important prerequisite.

Lighting plays the greatest influence in visual matching. Incorrect lighting leads to incorrect assessments and thus necessarily to complaints and to increased costs in the production process.

Paints and pigments can visually awaken the same color impression, although they are different in the chemical and/or spectral composition, such as printing inks for offset printing, intaglio printing, digital printing systems on the basis of inkjet printer inks or toner-based systems, paints for the treatment of surfaces, or pigments for dyeing plastics or textiles. Frequently, it is required that these different materials are supposed to be identical in terms of color, for example a product picture in a catalog or the textile interior and the dashboard, made of plastic, in a car.

If these materials are assessed under different light conditions, these can look identical under a specific type of light, and differ completely under a different type of light. This is called metamerism.

In the printing process, for example, artwork for the printed products is increasingly being shown only on the monitor (called a soft proof in the technical language), instead of using a proof as the print artwork, and these soft proofs have already achieved a high quality level both for matching in the printing pre-stage and on the control console of the printing machine.

The LCD monitors used for the soft proof have reached a high color reproduction quality in the meantime, and for this reason, any remaining visible color differences are now ascribed to the color reproduction properties of the lighting used for the color assessment.

Specifically in the case of monitor workstations, in which the print artwork is coordinated and released online at different locations (for example: printing client in Hamburg; print pre-stage in Munich, and printer in Stuttgart) (referred to as remote soft proof in the technical language), this is criticized by manufacturers and users as a disadvantage of these proof systems.

While the known color coordination systems predominantly used for color matching, on the basis of fluorescent lamps, meet the requirements of the currently valid ISO standard 3664 for color matching, they no longer meet the high quality demands of the new proof technologies.

As a typical example, the color matching system according to DE 10 2005 019 135 A1 will be mentioned here; however, the same holds true also for color matching systems of the manufacturers Graphic Technology Inc. (GTI), USA; Verivide, UK, or Xrite, to mention only a few examples.

While fluorescent lamps are an advantageous light source for a color matching cabin of a color coordination system, the spectral distribution of these lamps has multiple peaks, so-called peaks, which are attributable to the different gas discharges in the fluorescent lamp (for example mercury at 546 nm). Thus, the color reproduction cannot be directly assessed by way of a spectral comparison of test light type and reference light type, but rather only using the color impression that results, in each instance. For this purpose, the comparison, tolerances for the color location of the light source, the color reproduction index, and the metamerism index, are therefore generally used.

However, these tolerances are too broad for future applications, and therefore make the current standard light devices usable only with restrictions.

Another problem contains the aging behavior of the fluorescent lamps. The phosphors used in the fluorescent lamps as a fluorescent change their light color with increased aging. Empirical values show that the known fluorescents are suitable for adhering to the current tolerances, which are still very broad, only for 2500 hours of operation.

Since the color location shift is a permanent process, the known fluorescents can be used only for a clearly shorter time for future applications, since the color location shift is very clearly perceived by the human eye.

Furthermore, the question concerning the "right" color temperature is being asked more and more often. Thus, at the present time, the alternative use of the standard light type D65 is already being demanded in many cases; this is already being used as a matching light in many related industries such as the textile or automotive industry.

As has already been mentioned above, the spectrum of a fluorescent lamp is not adjustable. The user is forced to additionally acquire new matching devices for matching under a different type of light.

Furthermore, light sources based on LEDs have been known for several decades. Their long useful lifetime and their robustness are only two of many reasons that predestine them for a multitudinous number of applications in daily life. However, because of their spectral properties, LEDs are not suitable, even today, for applications for the purpose of visual color assessment.

The spectrum of white LEDs is very incomplete, and therefore the color reproduction properties are unsuitable for the applications in visual color matching that have been described. For example, the color reproduction index clearly lies below the required value of 90.

Various approaches for simulating daylight on the basis of the R-G-B technology, by means of additive color mixing with red (R), green (G), and blue (B) LEDs, something that would theoretically be possible, are known.

However, natural daylight has a uniform spectral progression from 380 nm to 780 nm, and furthermore, UV components are contained in daylight.

However, since colored light-emitting diodes do not cover a spectrum, but rather produce light only at a specific wavelength, while it is true that all possible light colors can be produced with RGB LEDs, only very incomplete simulation of daylight is possible by means of the combination of three-color LEDs.

The color reproduction properties are therefore limited, and for this reason, all attempts to produce high-quality daylight simulation for visual color assessment according to the standards ISO 3664 or DIN 6173, for example, on the basis of LED technology, have failed.

There are currently many other applications with LEDs, but there, the spectral properties of the light are not important.

A system according to DE 10 2006 003 257 A1, a device for detecting optical reference marks, could be mentioned here as an example. This system comprises a lighting device having LED chips, which are affixed to a circuit board, together with a camera, and the LED chips are used to illuminate the positioning field of the camera.

In this application, all that is important is the uniformity of the illumination of the positioning field, whereby no spectral properties of the light are specified.

Another application of LED lamps is a dental treatment lamp for producing a light field for treatment with a dental material that is cured by light, for example according to DE 10 2006 038 504 A1. White and colored LEDs or exclusively colored LEDs are used as a light source, in order to illuminate the oral cavity with a white light field having a color temperature of 3600 to 6500 K and an illumination intensity of 8000 lx. The color reproduction index Ra according to CIE (Commission internationale de l'eclairage) 13.3 lies at about 85.

DE 10 2004 049 604 A1 discloses a lighting system for a printing machine with LEDs having the colors red, green, and blue. This lighting system is used to better detect the changes in color, behavior, and contrast on the imprinted material in the delivery of the printing machine than is possible under white-light conditions. The disadvantage of this system is, as has already been stated above, that no high-quality daylight simulation is possible when using only LEDs in the primary colors red, green, and blue.

With EP 1 314 972 A1, a spectral photometer or color densitometer and its use are disclosed; in particular, only a small measurement spot is illuminated with this device. This device is not suitable for spectral measurement of colors.

Finally, another device for lighting is disclosed with WO 2007/083250 A1, in which the behavior of the light source is monitored and corrected, but for the purpose that light sources of low quality and/or useful lifetime can be used, which can be unimportant in one application or another, where quality requirements are low, but these cannot be used for the applications mentioned initially. Furthermore, this device has a complicated technology.

SUMMARY OF THE INVENTION

Proceeding from this state of the art, the task of the invention consists in the creation of a method with which any desired daylight spectrum along the Planckian locus can be simulated on the basis of LED light sources, at high quality, in stable manner, and permanently. It is furthermore the task of the invention to create a multispectral color coordination system for performing the method according to the invention.

This task is accomplished with a method of the type described initially, having the method steps indicated in claim 1.

Accordingly, the method according to the invention, for simulation of daylight or artificial light spectra of high quality, comprises the following Method Steps:

a) producing light by means of a plurality of LEDs disposed in groups, whereby
   each group is formed from LEDs positioned in compact manner next to one another, and
   the LEDs within each group emit light at different wavelengths, so that
   light of a specific spectrum to be simulated is emitted by each group,
b) measuring the spectra of the light emitted by each individual LED at different predetermined working temperatures,
c) calculating the tristimulus values XYZ (CIE1931 2°) for each measured temperature range, preferably with linear interpolation of the intermediate values,
d) storing the calculated tristimulus values in memory, with assignment to the working temperatures and the PWM values as color characteristics for each LED,
e) actuating the LEDs at the working temperatures and PWM values selected from the memory content, as a function of the spectrum to be simulated,
f) during a predetermined cycle frequency, constantly repeatedly measuring the working temperature of each individual LED chip and comparing it with the tristimulus values stored in memory with regard to working temperature,
g) in case of agreement of the current measurement result with the stored value: continuing to actuate the LED in question at the previous values for the working temperature,
h) in case of deviation of the current working temperature from the stored value: determining the tristimulus values that belong to the current working temperature and/or a suitable PMW value from the memory content assigned to this LED.

Method steps for embodying the invention are indicated in claims 2 to 6.

The method according to the invention is particularly suitable for simulation of high-quality daylight or artificial light spectra at color temperatures in the range of 2,700 K to 10,000 K, and therefore can be used above all for the purpose of lighting matching surfaces in comparison color matching of prints, textiles, and similar products, having defined, predetermined color characteristics.

According to the invention, a homogeneous spectral progression in the emitted light is produced over the entire lighted sampling surface, on the basis of LED light sources, whereby the quality requirements that correspond to the applicable international standards for reference light types (for example ISO 3664:2009, DIN 6173, CIE 13.3 or CIE 51.2) and daylight simulation are fulfilled better than was possible until now.

In particular, the high quality of daylight simulation is permanently assured with the method steps b) to g) according to claim 1 that serve for basic calibration, and with the method steps h) to k) according to claim 3 that are provided for permanent autocalibration.

With the invention, it is avoided that the emitted light consists only of a sequence of light beams or light bundles having different wavelength peaks.

Above all, with the method according to the invention, the prerequisite for the development of multispectral color coordination systems having LED light sources is created, which can produce the light types D50 and D65 for the graphics industry as well as also other light types such as A, C, D55, D75, but also every other type of artificial light, at excellent quality, as a reference light, so that the simulation of high-quality light spectra along the Planckian locus is possible.

In this regard, the task of the invention is also accomplished with an arrangement, namely a multispectral color coordination system, that has the characteristics according to claim 7.

The multispectral color coordination system described in claim 7 is intended for performing the method described above. It particularly serves for the purpose of lighting matching surfaces in comparison matching of prints, textiles, and similar products, having defined, predetermined color characteristics.

It comprises:

multiple groups of LEDs disposed on a base surface, next to one another, whereby each group is formed from LEDs disposed next to one another in compact manner, which emit light at different wavelengths that lie within the spectrum of 380 nm to 700 nm, a first measurement device, configured for wavelength measurement of the light emitted by each individual LED, as a function of the actuation with different PWM values and the setting of different working temperatures, a measurement value memory unit for storing the tristimulus values XYZ determined from the spectra, with assignment to the PWM and working temperature values, a second measurement device, configured for constantly repeated measurement, at a predetermined cycle frequency, of the working temperature of each individual LED chip, and for comparison with the tristimulus values XYZ assigned to the working temperature, stored in the memory of the first measurement device, a computer unit connected with the measurement value memory unit, configured for determining the corrected PWM values and working temperatures for each individual LED, as a function of deviations of the current tristimulus values from the stored measurement value, and an actuation circuit for actuating the LED in question, with values corrected for the purpose of compensating the deviation.

Embodiments are possible with the characteristics according to claims 8 and 9.

In commercial use of the multispectral color coordination system according to the invention, it is advantageous if a basic calibration is carried out at the manufacturer, even before delivery to the operator, while the autocalibrations then take place in ongoing operation, permanently, in the background, and thus the high quality of the daylight simulation is assured for the long term.

However, the multispectral color coordination system having a LED lamp with multiple multispectral LED light sources is not solely restricted to simulating only reference light types along the Planckian locus, but rather all the combinations that lie in the available color range (gamut) can be simulated.

The LED lamp of the new multispectral color coordination system possesses high-quality, selected LED light sources, which demonstrate only slight quality decreases over time, in other words with an increasing number of operating hours. For this reason, a closed, complicated regulation circuit with sensors is not necessary.

The core of the invention also consists in that the properties and the color range (gamut) of each individual LED light source is learned during the basic calibration, by means of storing it in a control unit that belongs to the multispectral color coordination system, and can be called up from there for every individual case of setting the lighting (reference light). A white daylight with extremely high quality is simulated, in order to light matching surfaces.

The total spectrum of the light (light bundle) produced allows illumination of surface areas up to several square meters; the color temperature is infinitely adjustable along the Planckian locus, from 2,700 Kelvin to 10,000 Kelvin. The color reproduction index Ra according to CIE 13.3 is greater than 90. The quality of the daylight simulation is expressed in metamerism indices, according to CIE 51.2. In the new multispectral color coordination system, these are <1 in the visual spectrum (MIvis) and <1.5 in the UV range (MIuv).

One or more LED light sources is/are used in a LED lamp for the new multispectral color coordination system. The number of required multispectral LED light sources is determined by the size of the illuminated surface and the required brightness. In the new multispectral LED light sources, power LED chips having different colors are combined on a surface area of a few $mm^2$, whereby it is advantageous if white and colored LEDs are used.

From a technical point of view, a white LED light source according to the invention consists primarily of a blue LED having a peak wavelength of 460 nm. The blue LED is covered with a fluorescence pigment that emits yellow light at a peak wavelength of 600 nm. The gaps between the two peak wavelengths are filled up using green LEDs.

In order to be able to produce reference light types for daylight simulation from 2,700 K (light type A) to 10,000 K along the Planckian locus, the wavelength range is supplemented with blue and UV LEDs in the range from 350 nm to 460 nm, and the wavelength range >600 nm is supplemented with red LEDs.

In this connection, the LED that emits white light preferably consists of a blue LED having a layer of cerium-doped yttrium-aluminum-garnet powder that fluoresces yellowish, which layer lies above the LED. However, the use of blue LEDs in combination with other fluorescence pigments or fluorescents, which also convert the blue light, which has a higher energy, into light at a longer wavelength, which has a lower energy, also lies within the scope of the invention.

Using the combination of a white LED with colored LEDs indicated as an example in claims 2 and 6, it is possible to simulate the visible light spectrum at high quality, and also, to cover the required UV components. However, the invention is not restricted to this combination; other combinations and shifts in the wavelength ranges are also possible, in order to achieve the desired result.

In order to use multispectral LED light sources for simulation of reference light types, the following factors must be considered:

LED chips are mass-produced products that can be very different from chip to chip, in terms of spectral behavior and brightness yield, the development speed of ever newer chips is meteoric, and the supply of always the same chips, at a specific wavelength, over an extended period of time, for example over several years, cannot be guaranteed by anyone, the spectral behavior, brightness yield, and also the useful lifetime of LED chips are significantly dependent on the operating temperature, the use of multiple multispectral LED light sources for the production of standardized light in a LED lamp is only possible if the spectral properties of the individual multispectral LED light source correspond precisely to the properties of all the LED light sources in a LED lamp.

For the user, however, it must be ensured that all the devices possess the same high-quality spectral properties over many years, and even if an individual multispectral LED light source in a device is replaced, the spectral properties are not changed.

For this reason, an essential core point of the invention also lies in the manner of calibration of each LED lamp, and in the temperature management.

The new calibration method is characterized by the following characteristics:

1. a Basic Calibration

In order to calibrate the LED device, it is necessary to spectrally measure each individual LED chip on each multispectral LED light source. Each multispectral LED light source consists of multiple LED chips that are brought together within a very small space, on a circuit board. Within the scope of the invention, for example, LED chips in the wavelength ranges 400 nm to 405 nm, 450 nm to 455 nm, 470 nm to 475 nm, 525 nm to 530 nm, 620 nm to 630 nm, are used, as well as an individual LED that emits light at a wavelength of 460 nm, which is combined with a fluorescence pigment, whereby the fluorescence pigment, excited by the light having the wavelength 460 nm, additionally emits light at a wavelength of 600 nm, and in addition, the residual component of light emitted at 460 nm is filtered out by way of a yellow filter. The invention is, however, by no means restricted to this combination, but rather a significant advantage of the invention consists in the fact that it is variable in this regard.

The spectral measurement is carried out on each individual LED chip of each multispectral LED light source. From the spectra obtained, the tristimulus values XYZ according to CIE 1931 are calculated for the 2° observer. Because, as has been described above, LEDs are greatly temperature-dependent, these measurements are carried out over the entire permissible working temperature range, in this case 20° C., 30° C., 40° C., and 50° C. Studies have shown that the spectra change in linear manner between the temperature measurement points, and for this reason, values between 20 and 30° C., 30 and 40° C., and between 40 and 50° C. can be determined by way of a linear interpolation. All measurement and calculation values are stored in memory in a LUT in the microcontroller, and can be updated by way of a USB connection at any time. Every light type can be calculated from these measurement and calculation values, in the color space that can be simulated with the LED device.

2. A Permanent Autocalibration

In order to adjust a light color with defined x, y color coordinates and Y brightness (for example light type D50, D65, A, etc.), a 16-bit PWM controller is used (with PWM of pulse width modulation). The microprocessor looks for the PWM values stored in the LUT, with the optimal setting for each individual LED chip, so that all the different LED light sources produce the same light and, in the end result, jointly correspond to the desired light. In other words: Each individual LED chip is actuated with a different setting, in order to achieve a uniform result for all the LED light sources. The search for the best possible setting is carried out in multiple steps, particularly by means of iteration. It is important to run through these calculations for each individual LED light source in the LED device separately, also in the event of a required replacement of a defective LED light source in the LED device.

The microprocessor checks the working temperature of the multispectral LED light source at short intervals, and permanently recalculates the PWM value as a function of the working temperature, in order to keep the spectral properties x, y, Y of the set light type stable.

Aside from the LUT tables with the PWM values, tables with the coefficients that describe the following are stored in the microprocessor:

1. the size of the component of the white LED (W) in the light produced,
2. the ratio between the blue colors B1 and B2,
3. the size of the UV component.

The first coefficient has a significant influence on the spectral quality of the light result. The "spectral connection" to the other LED chips UV-B1-B2-G-R is produced by means of the yellow-white spectrum of the white LED W. In an extreme case, if the LED W is not turned on, it is true that the greatest color space could be simulated, but the light would consist practically only of three peaks with correspondingly poor color reproduction, and it would be unusable in the sense of practical use.

The $2^{nd}$ and $3^{rd}$ coefficients have a clearly lesser influence on the spectral quality, but they are needed to optimize the spectrum produced and to achieve the best possible light simulation.

3. One or More Recalibrations

After several months of intensive use of the LED lamp, also referred to as a LED device in the specification, an aging process will start, which will be different for each individual multispectral LED light source. For this reason, a recalibration of the LED device will be necessary at regular intervals, in order to eliminate these changes.

For a recalibration of the LED device, all the measurements of the basic calibration are repeated, and new values are stored in the LUT in the microprocessor, thereby essentially restoring the new state in the LED device.

The use of multiple multispectral LED light sources for producing standardized light in a LED device is only possible if the spectral properties of the individual multispectral LED light sources precisely correspond to the properties of old LED light sources in a LED device. This is only possible if the LEDs are cooled by way of an excellent temperature management system, and if the electronic controller and the voltage supply for each individual LED light source in a LED device are independent of one another and do not reciprocally impair one another.

While it is true that the invention characteristics identified above demonstrate several preferred embodiments, other embodiments according to the invention, as mentioned in the discussion, are also being considered. This disclosure offers illustrative embodiments according to the invention as examples, and not as restrictions. A person skilled in the art can think up numerous other modifications and embodiments that fall within the scope and the spirit of the principles according to the invention.

With the invention described above, it has been possible to develop a method with which any desired light spectrum can be simulated at high quality. Thus, it is possible not only to simulate the light types D50 and D65 for the graphics industry, but also all other types of light such as A, C, D55, D75, or also artificial light of any type, with excellent quality. Demanding industrial applications can thereby be opened up. In order to avoid metamerism caused by optical brighteners, UV components are also taken into consideration, according to the invention.

It is essential, in this connection, that each individual LED group that emits multispectral light, which is an integral part of the entire multispectral color coordination system, is calibrated, and the spectral properties of each LED are stored in memory. The multistage calibration is divided into the basic calibration at the plant and a calibration that is carried out automatically, which is constantly carried out during operation, in that the operating conditions are monitored without interruption and the light result is permanently regulated, at high frequency, invisible to the human eye.

As a result, not only the conventional technology with regard to light quality is it possible to simulate, but also for the first time it is possible to simulate a very large light color space at extremely high quality, and thus to implement all possible applications in a device.

Another great advantage is the longer useful lifetime of the LED light sources that can be achieved with this method, in comparison with conventional fluorescent lamp technology, and a useful lifetime that is almost a hundred times longer as compared with halogen technology with filters. This means not only uniform light quality over an extended period of time, but also a significant cost saving. In addition, the environment is protected, since fluorescent lamps contain harmful substances such as mercury and phosphorus, for example, and therefore must be disposed of as hazardous waste.

BRIEF DESCRIPTION OF THE DRAWINGS

The invention will be explained in greater detail below, in comparison with the state of the art and using exemplary embodiments. In the related drawings, the figures show.

DETAILED DESCRIPTION OF PREFERRED EMBODIMENTS

Figure 1:
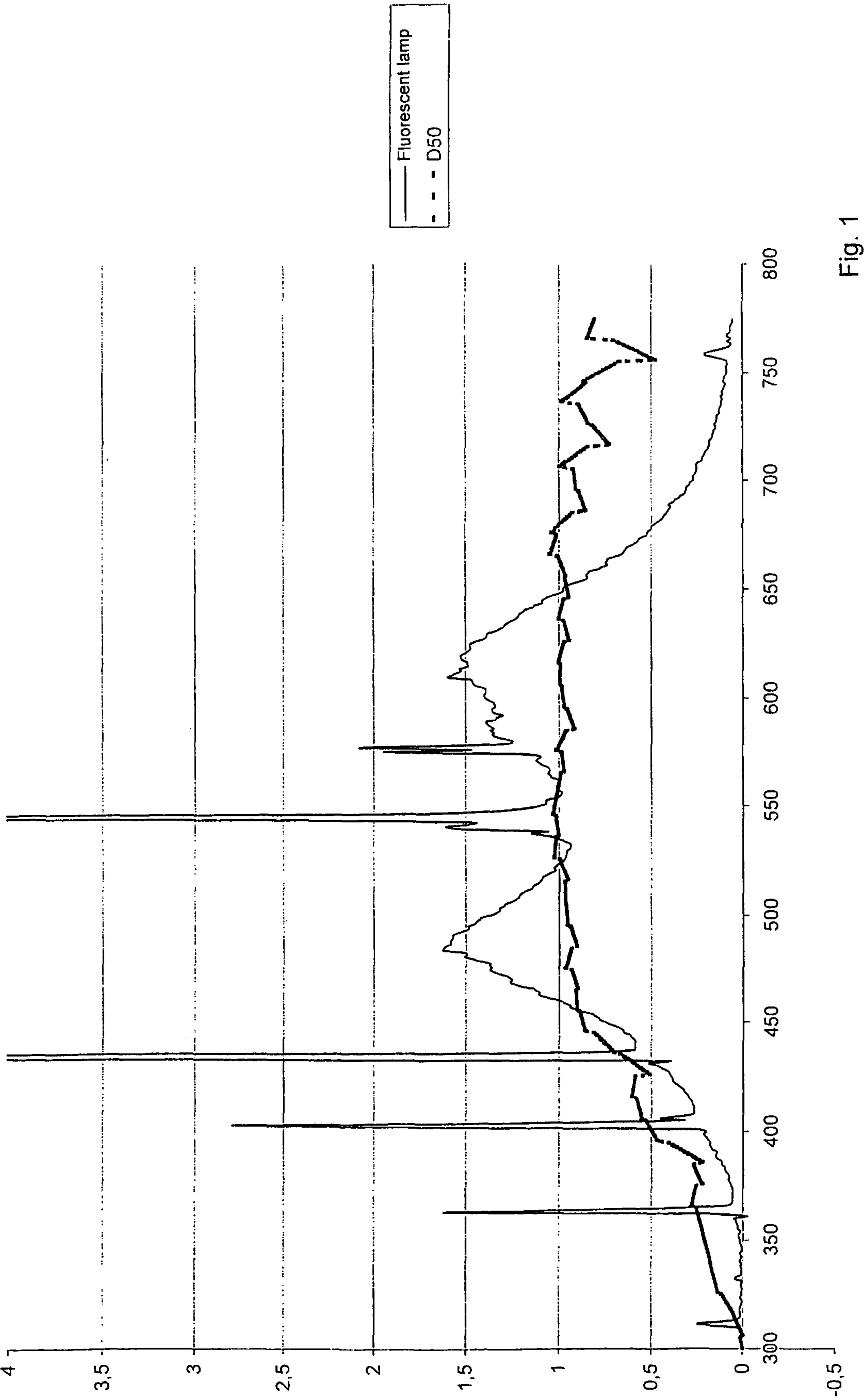
FIG. 1 as the state of the art, the spectral progression of a fluorescent lamp in one of its typical applications, namely for simulation of CIE standard light type D50, which corresponds to noon light with direct sun radiation at 5,000 Kelvin color temperature, FIG. 2 also as the state of the art, the spectral progression of a LED that emits white light, in comparison with the CIE standard light type D50, FIG. 3 furthermore as the state of the art, the incomplete simulation of daylight with only three LEDs, one of which emits a red light, another a green light, and another a blue light, FIG. 4 as an example, the possibility of simulating any desired daylight spectrum along the Planckian locus with multispectral LED light sources, FIG. 5.1 a comparison of the spectrum of the CIE standard light type D50 with a simulation of this spectrum achieved with the method according to the invention or with the color coordination system according to the invention, respectively, FIG. 5.2 a comparison of the spectrum of the CIE standard light type D65 with a simulation of this spectrum achieved with the method according to the invention or with the color coordination system according to the invention, respectively, FIG. 5.3 a comparison of the spectrum of the CIE standard light type A with a simulation of this spectrum achieved with the method according to the invention or with the color coordination system according to the invention, respectively, FIGS. 6.1 to 6.3 the principle of the placement of LEDs in groups on a light-emitting surface, whereby high-quality simulated daylight of precisely the same spectrum is emitted by each group, in accordance with the idea of the invention, and FIG. 7 a multispectral color coordination system according to the invention.
Figure 2:
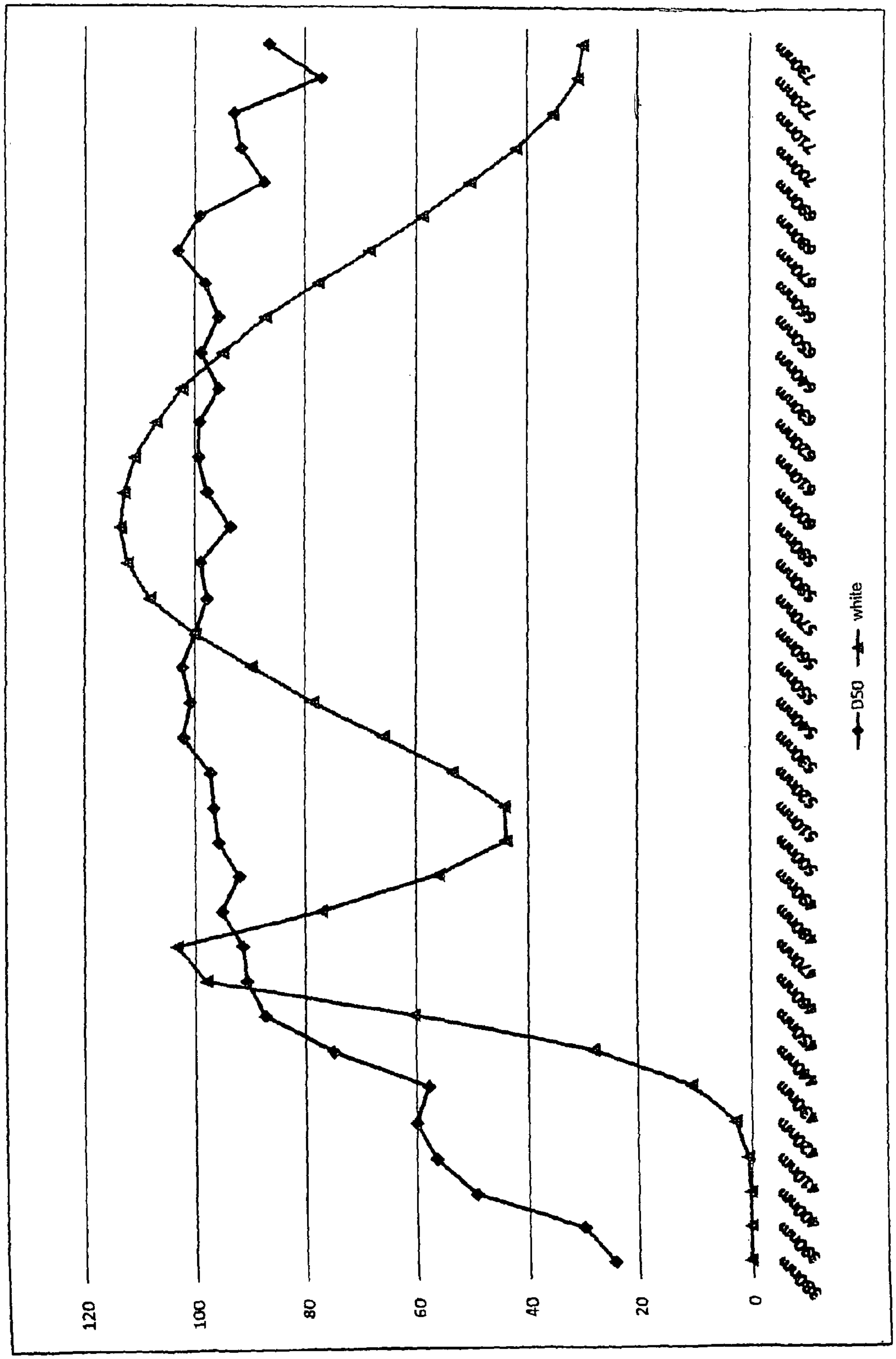
Figure 3:
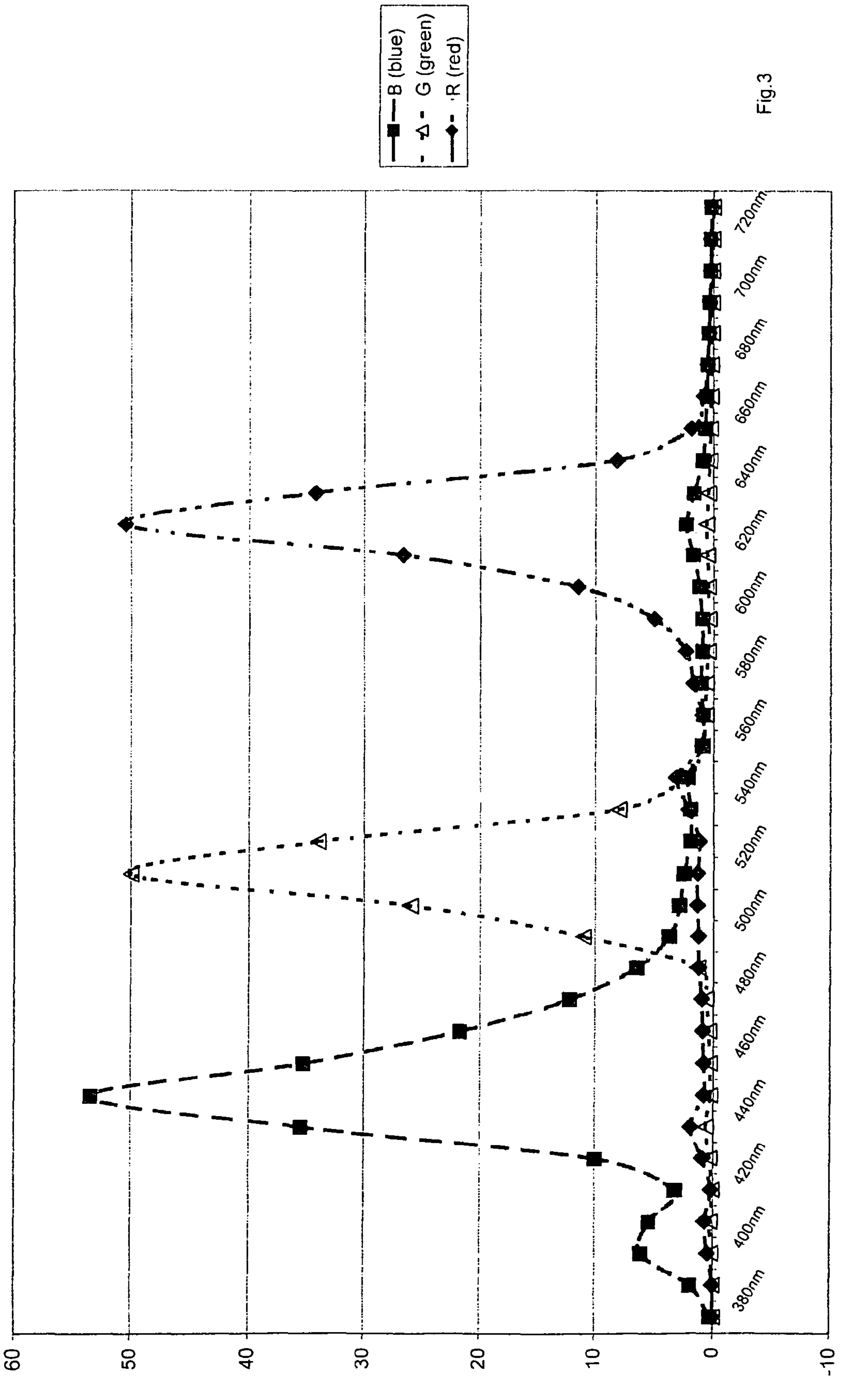

Examples from the state of the art are shown in FIGS. 1 to 3.

Thus, the comparison of the spectral progression of the CIE standard light type D50 with the application-typical simulation of this spectral progression by means of a fluorescent lamp can be seen in FIG. 1. This simulation has been used until now, for example, for lighting when assessing printing results.

Using FIG. 1, it is evident that the spectrum of the light of this fluorescent lamp has multiple peaks, so-called peaks, which are attributable to gas discharges in the fluorescent lamp, such as mercury at 546 nm, for example. As a result, the color reproduction cannot be assessed directly by way of the spectral comparison of test light type and reference light type, but rather only using the resulting color impression, in each instance, so that tolerances for the color location of the light source, the color reproduction index, and the metamerism index usually have to be used, and this reduces the quality and efficiency when lighting matching surfaces.

In FIG. 2, the difference of the spectral progression of the light emitted by a white LED in comparison with the spectral progression of the CIE standard light type D50 can be seen. From this, it is evident that the spectrum of the white LED is very incomplete. The color reproduction index lies far below the required value of 90, and for this reason, the color reproduction properties are unsuitable for applications for color matching.

FIG. 3 shows an example for the simulation of daylight according to the state of the art, by means of additive color mixing with only three LEDs, of which one LED emits red light, one emits green light, and one emits blue light. Although white light from this color mixture is theoretically possible, simulation of daylight, in this manner, is only possible with the very incomplete spectral progression shown in FIG. 3, because natural daylight has a uniform spectral progression from 380 nm to 780 nm and further also contains UV components, but the RGB LEDs do not cover a spectrum, but rather emit light only at a specific wavelength.

Figure 4:
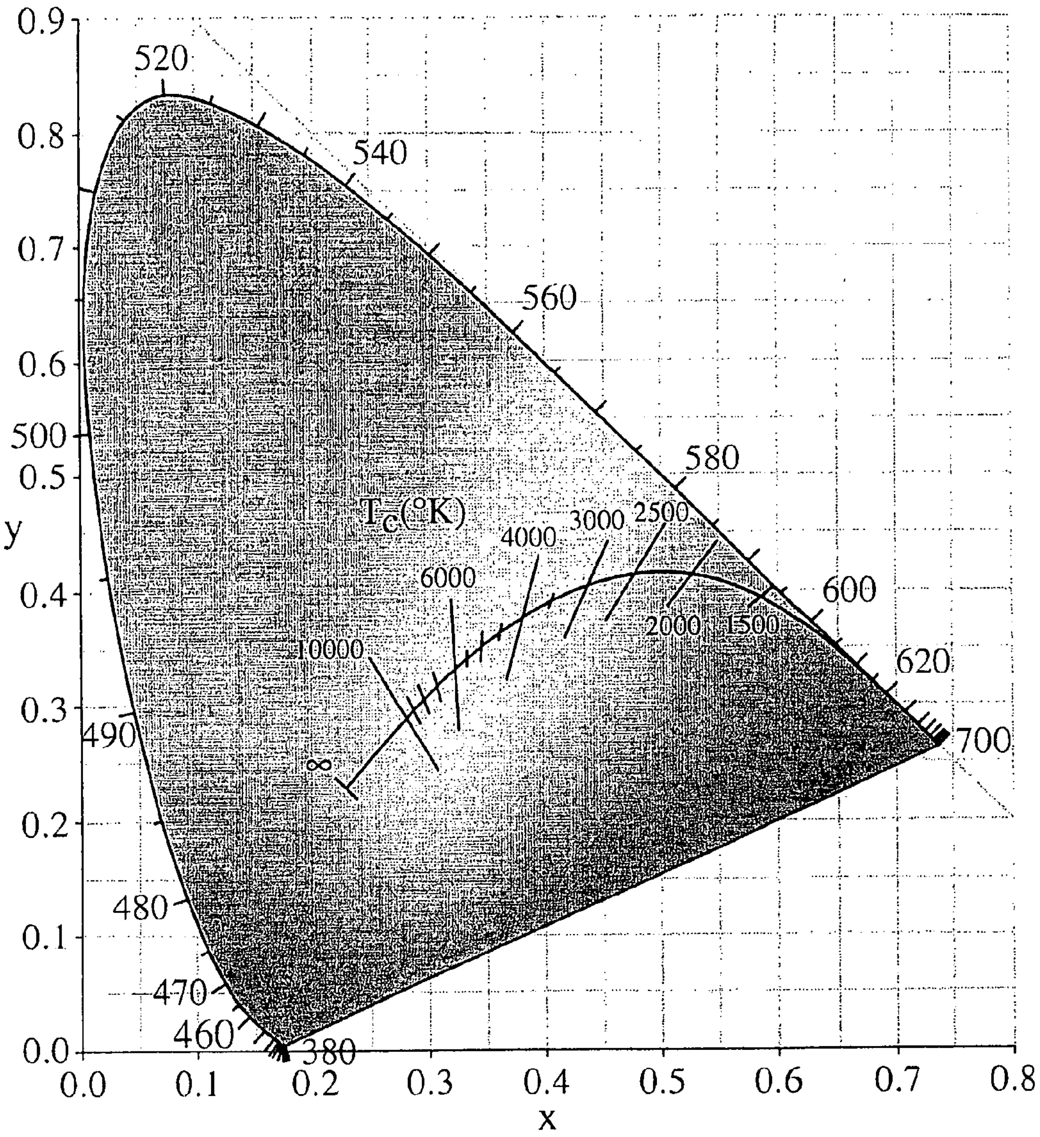

The fundamental possibility of simulating any desired daylight spectrum along the Planckian locus in the CIE 1931 standard system by means of a multispectral LED light source, using LEDs of different colors, is shown in FIG. 4.

Thus, it is possible, by suitably combining colored LEDs and coordinating the wavelengths emitted by these LEDs with one another, in defined manner, to produce a homogeneous spectral progression in the entire emitted light, whereby the quality demands of the applicable international standards for the reference light types and for daylight simulation are fulfilled in a better way than was possible until now.

This is what the method according to the invention and the color coordination system according to the invention are aimed at. In this connection, it is an integral part of the idea of the invention not just to achieve high-quality daylight simulation for a short time, but rather to guarantee it permanently, over the long term. This is achieved, according to the invention, with a basic calibration and with subsequent autocalibrations that take place permanently, during ongoing use of the color coordination system.

In FIG. 5.1 to FIG. 5.3, examples of the simulation of daylight spectra, according to the invention, by means of LEDs, are shown.

Thus, FIG. 5.1, as an example, shows the spectrum of the CIE standard light type D50 in the form of a broken heavy line "D50" and, above it, a thin solid line "LED-D50" shows the spectrum of this standard light type simulated by means of LEDs.

In order to achieve this, each group of LEDs positioned next to one another in compact manner, which emits the simulated daylight spectrum, in other words every multispectral LED light source, in the sense of the invention, comprises:

a first LED that emits light at a wavelength of 400 nm to 405 nm, second and third LEDs emitting light at a wavelength of 460 nm, which are combined with a fluorescence pigment, whereby the fluorescence pigment excited by the light having the wavelength 460 nm additionally emits light having a wavelength of 600 nm, and whereby in addition, the remaining emitted component of light having a wavelength of 460 nm is filtered out, by way of a yellow filter, a fourth LED emitting light at a wavelength of 450 nm to 455 nm, a fifth LED emitting light having a peak wavelength of 470 nm to 475 nm, a sixth LED emitting light having a peak wavelength of 525 nm to 530 nm, and a seventh LED emitting light having a peak wavelength of 620 nm to 630 nm.

The colorimetric characteristics of each LED chip are known for every temperature range, from the basic calibration, and are present in the LUT. The controller now calculates the x, y coordinates of the light type D50 from the XYZ values, colorimetrically, as a function of the desired brightness Y, and actuates each individual LED chip as a function of the inherent temperature of the chip, in each instance, and thereby produces the desired light result for the light type D50, as a mixture.

FIG. 5.2, as an example, shows the spectrum of the CIE standard light type D65 in the form of a line with the rhombus "D65 (1)" and, above it, a line with a triangle "D65_sim" shows the spectrum of this standard light type simulated by means of LEDs.

In order to achieve this, each group of LEDs positioned next to one another in compact manner, which emits the simulated daylight spectrum, in other words each multispectral LED light source, in the sense of the invention, comprises:

a LED that emits light at a wavelength of 400 nm to 405 nm, two LEDs that emit light at a wavelength of 460 nm, each of which is combined with a fluorescence pigment, whereby the fluorescence pigment excited by the light having the wavelength 460 nm additionally emits light having a wavelength of 600 nm, and whereby in addition, the remaining emitted component of light having a wavelength of 460 nm is filtered out, by way of a yellow filter, and one each of a LED emitting light at a wavelength of 450 nm to 455 nm, 470 nm to 475 nm, 525 nm to 530 nm, and 620 nm to 630 nm.

The colorimetric characteristics of each LED chip are known for every temperature range, from the basic calibration, and are present in the LUT. The controller now calculates the x, y coordinates of the light type D65 from the XYZ values, colorimetrically, as a function of the desired brightness Y, and actuates each individual LED chip as a function of the inherent temperature of the chip, in each instance, and thereby produces the desired light result for the light type D65, as a mixture.

FIG. 5.3, as an example, shows the spectrum of the CIE standard light type A in the form of a broken line with the rhombus "A" and, above it, a solid line with a triangle "A-sim" shows the spectrum of this standard light type simulated by means of LEDs.

In order to achieve this, each group of LEDs positioned next to one another in compact manner, which emits the simulated daylight spectrum, in other words each multispectral LED light source, in the sense of the invention, comprises:

a first LED that emits light at a peak wavelength of 400 nm to 405 nm, second and third LEDs that emit light at a wavelength of 460 nm, each of which is combined with a fluorescence pigment, whereby the fluorescence pigment excited by the light having the wavelength 460 nm additionally emits light having a wavelength of 600 nm, and whereby in addition, the remaining emitted component of light having a wavelength of 460 nm is filtered out, by way of a yellow filter, and a fourth LED emitting light at a peak wavelength of 450 nm to 455 nm, a fifth LED emitting light at a peak wavelength of 470 nm to 475 nm, a sixth LED emitting light at a peak wavelength of 525 nm to 530 nm, and a seventh LED emitting light at a peak wavelength of 620 nm to 630 nm.

The colorimetric characteristics of each LED chip are known for every temperature range, from the basic calibration, and are present in the LUT. The controller now calculates the x, y coordinates of the light type A from the XYZ values, colorimetrically, as a function of the desired brightness Y, and actuates each individual LED chip as a function of the inherent temperature of the chip, in each instance, and thereby produces the desired light result for the light type A, as a mixture.

The principle of the arrangement of the plurality of LEDs L1, . . . , Ln in groups G1, . . . , Gn on a light-emitting surface of the color coordination system according to the invention is illustrated using FIGS. 6.1 to 6.3. In this connection, each group G1, . . . , Gn consists of LEDs L1, . . . , Ln disposed close to one another, and each of these groups G1, . . . , Gn emits the spectrum to be simulated, for example of the spectra as shown in FIGS. 5.1 to 5.3, whereby the LEDs are present in the combination mentioned there, in each instance, with regard to the emitted wavelengths.

Figure 7:
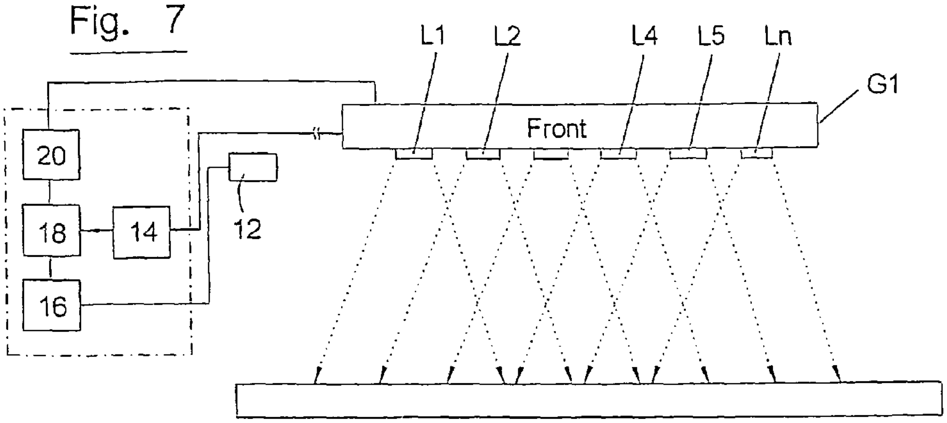

FIG. 7 shows a multispectral coordination system according to one embodiment of the invention, which includes:

multiple groups of LEDs L1 to Ln disposed on a base surface G1, next to one another, whereby each group is formed from LEDs disposed next to one another in compact manner, which emit light at different wavelengths that lie within a spectrum of 380 nm to 700 nm;

a first measurement device 12, configured for wavelength measurement of the light emitted by each individual LED, as a function of an actuation with different PWM values and a setting of different working temperatures;

a measurement value memory unit 16 for storing tristimulus values XYZ determined from the spectra, with assignment to the PWM and working temperature values;

a second measurement device 14, configured for constantly repeated measurement, at a predetermined cycle frequency, of the working temperature of each individual LED group, and for comparison with the tristimulus values XYZ assigned to the working temperature, stored in the memory of the first measurement device 12;

a computer unit 18 connected with the measurement value memory unit 16, configured for determining the corrected PWM values and working temperatures for each individual LED, as a function of deviations of the current tristimulus values from the stored measurement value; and an actuation circuit 20 for actuating the LED in question, with values corrected for the purpose of compensating the deviation.

Note: In the present description of the invention, the terms “chip” and “LED chip” are used as synonyms for the term “individual LED light source.”

The invention claimed is:

1. Method for simulation of high-quality daylight or artificial light spectra at color temperatures in the range of 2,700 K to 10,000 K, particularly for the purpose of lighting matching surfaces in comparative color matching of prints, textiles, and similar products, having defined, predetermined color characteristics, comprising the following method steps:

a) producing light by means of a plurality of LEDs disposed in groups, whereby each group is formed from LEDs positioned in a compact manner next to one another, and the LEDs within each group emit light at different wavelengths, so that light of a specific spectrum to be simulated is emitted by each group, b) measuring the spectra of the light emitted by each individual LED at different predetermined working temperatures, c) calculating the tristimulus values XYZ for each measured temperature range, by linear interpolation of the intermediate values, d) storing the calculated tristimulus values in a memory, with assignment to the working temperatures and PWM values as color characteristics for each LED, e) actuating the LEDs at the working temperatures and PWM values selected from the memory content, as a function of the spectrum to be simulated, f) during a predetermined cycle frequency, constantly repeatedly measuring the working temperature of each individual LED group and comparing it with the tristimulus values stored in memory with regard to the working temperatures, g) in case of agreement of a current measurement result with the stored value: continuing to actuate the LED in question at the previous values for the same working temperature, h) in case of deviation of the current working temperature from the stored value: determining the tristimulus values that belong to the current working temperature and/or a suitable PWM value from the memory content assigned to this LED.

2. Method according to claim 1, in which the following are positioned in each group:

a first LED that emits light having a peak wavelength of 400 nm to 405 nm, second and third LEDs emitting light at a wavelength of 460 nm, combined with a fluorescence pigment, whereby the fluorescence pigment excited by the light having the wavelength 460 nm additionally emits light having a wavelength of 600 nm, and whereby in addition, the remaining emitted component of light having a wavelength of 460 nm is filtered out, by way of a yellow filter, a fourth LED emitting light having a peak wavelength of 450 nm to 455 nm, a fifth LED emitting light having a peak wavelength of 470 nm to 475 nm, a sixth LED emitting light having a peak wavelength of 525 nm to 530 nm, and a seventh LED emitting light having a peak wavelength of 620 nm to 630 nm.

3. Method according to claim 2, having the additional method steps:

i) default setting and storing in the memory of reference values for a ratio of the component of the light emitted at the wavelengths 460 nm by the second LED and 620 nm to 630 nm by the seventh LED in a total radiation, a ratio of the component of the light (B1) emitted at the wavelength 450 nm to 455 nm by the fourth LED to the component of the light (B2) emitted at the wavelength 470 nm to 475 nm by the fifth LED, j) constantly repeated checking, at a predetermined cycle frequency, for adherence to the reference values, k) in the case of agreement of the result with the default values: continuing actuation of the LED in question at the previous PWM values, in the case of deviation of the result from the default values: determination of a PWM value that is suitable for compensating the deviation.

4. Method according to claim 3, in which the method steps h) to k) are undertaken as permanent autocalibrations, in order to set a light color having defined color coordinates x, y and a defined brightness Y.

5. Method according to claim 1, in which the method steps b) to g) are undertaken as a basic calibration, in order to determine the colorimetric characteristics of each individual LED, and storage in the memory takes place in a form of look-up table (LUT), in order to represent a possible color space that can be simulated with the LEDs, in total.

6. Method according to claim 1, in which simulation of standard light types takes place along the Planckian locus.

7. Multispectral color coordination system, particularly for the purpose of lighting matching surfaces in comparison color matching of prints, textiles, and similar products, having defined, predetermined color characteristics, comprising:

multiple groups of LEDs disposed on a base surface, next to one another, whereby each group is formed from LEDs disposed next to one another in a compact manner, which emit light at different wavelengths that lie within a spectrum of 380 nm to 700 nm, a first measurement device, configured for wavelength measurement of the light emitted by each individual LED, as a function of an actuation with different PWM values and a setting of different working temperatures, a measurement value memory unit for storing tristimulus values XYZ determined from the spectra, with assignment to the PWM and working temperature values, a second measurement device, configured for constantly repeated measurement, at a predetermined cycle frequency, of the working temperature of each individual LED group, and for comparison with the tristimulus values XYZ assigned to the working temperature, stored in the memory of the first measurement device, a computer unit connected with the measurement value memory unit, configured for determining corrected PWM values and working temperatures for each individual LED, as a function of deviations of the current tristimulus values from the stored measurement value, and an actuation circuit for actuating the LED in question, with values corrected for the purpose of compensating the deviation.

8. Multispectral color coordination system according to claim 7, in which the following are provided in each group of LEDs:

a first LED that emits light having a peak wavelength of 400 nm to 405 nm, second and third LEDs emitting light at a wavelength of 460 nm, combined with a fluorescence pigment, whereby the fluorescence pigment excited by the light having the wavelength 460 nm additionally emits light having a wavelength of 600 nm, and whereby in addition, the remaining emitted component of light having a wavelength of 460 nm is filtered out, by way of a yellow filter, and a fourth LED emitting light having a peak wavelength of 450 nm to 455 nm, a fifth LED emitting light having a peak wavelength of 470 nm to 475 nm, a sixth LED emitting light having a peak wavelength of 525 nm to 530 nm, and a seventh LED emitting light having a peak wavelength of 620 nm to 630 nm.

9. Multispectral color coordination system according to claim 8, in which the computer unit additionally stands in connection with a memory unit, in which reference values are stored, concerning a ratio of the component of the light emitted at wavelengths 460 nm by the second LED and 620 nm to 630 nm by the seventh LED in a total radiation, a ratio of the component of the light (B1) emitted at wavelength 450 nm to 455 nm by the fourth LED to the component of the light (B2) emitted at wavelength 470 nm to 475 nm by the fifth LED, whereby the determination of the corrected PWM values for the brightness control of each individual LED is provided for, taking these reference values into consideration.

* * * * *